United States Patent
Kabbinale et al.

(10) Patent No.: US 11,860,721 B2
(45) Date of Patent: Jan. 2, 2024

(54) UTILIZING AUTOMATIC LABELLING, PRIORITIZING, AND ROOT CAUSE ANALYSIS MACHINE LEARNING MODELS AND DEPENDENCY GRAPHS TO DETERMINE RECOMMENDATIONS FOR SOFTWARE PRODUCTS

(71) Applicant: Accenture Global Solutions Limited, Dublin (IE)

(72) Inventors: Ravindra Kabbinale, Bangalore (IN); Sherin Varghese, Bangalore (IN); Santhosh MV, Kasaragod (IN); Bhavana V Gudi, Bengaluru (IN); Sneha S. Shekar, Bangalore (IN); Shruthi Dhivakaran, Bengaluru (IN); Rajendra Prasad Tanniru, Basking Ridge, NJ (US); Aditi Kulkarni, Bangalore (IN); Vijeth Srinivas Hegde, Bangalore (IN); Koushik M. Vijayaraghavan, Chennai (IN)

(73) Assignee: Accenture Global Solutions Limited, Dublin (IE)

(*) Notice: Subject to any disclaimer, the term of this patent is extended or adjusted under 35 U.S.C. 154(b) by 36 days.

(21) Appl. No.: 17/380,763

(22) Filed: Jul. 20, 2021

(65) Prior Publication Data
US 2023/0021373 A1 Jan. 26, 2023

(51) Int. Cl.
*G06F 11/07* (2006.01)
*G06N 20/00* (2019.01)
(Continued)

(52) U.S. Cl.
CPC ........ *G06F 11/079* (2013.01); *G06F 11/0793* (2013.01); *G06F 11/3466* (2013.01);
(Continued)

(58) Field of Classification Search
CPC .. G06F 11/079; G06F 11/0793; G06F 11/302; G06F 11/3466; G06N 20/00
See application file for complete search history.

(56) References Cited

U.S. PATENT DOCUMENTS

| | | | |
|---|---|---|---|
| 11,113,144 B1* | 9/2021 | Gadepalli | G06F 11/0778 |
| 2018/0114120 A1* | 4/2018 | Bostick | G06N 20/00 |

(Continued)

*Primary Examiner* — Yolanda L Wilson
(74) *Attorney, Agent, or Firm* — Harrity & Harrity, LLP

(57) ABSTRACT

A device may receive software data identifying current logs and events associated with software products utilized by an entity and may process the software data, with a machine learning model, to generate error severity scores for the software products. The machine learning model may be trained based on historical software data identifying events and logs associated with software products utilized by the entity and based on a combination of historical health scores, historical sentiment scores, and historical dissimilarity scores for the software products. The device may process the error severity scores, with a prioritization model, to generate prioritized error scores and may process the error severity scores and the prioritized error scores, with a root cause analysis model, to generate root cause data identifying root causes associated with the error severity scores. The device may perform one or more actions based on the root cause data.

20 Claims, 10 Drawing Sheets

(51) Int. Cl.
*G06F 11/36* (2006.01)
*G06F 18/214* (2023.01)
*G06F 11/34* (2006.01)

(52) U.S. Cl.
CPC ........ *G06F 11/3604* (2013.01); *G06F 18/214* (2023.01); *G06N 20/00* (2019.01)

(56) References Cited

U.S. PATENT DOCUMENTS

| | | | |
|---|---|---|---|
| 2019/0163553 A1* | 5/2019 | Ramegowda | G06F 16/3344 |
| 2019/0294484 A1* | 9/2019 | Luo | G06N 20/00 |
| 2021/0103834 A1* | 4/2021 | Avadhanula | G06F 11/079 |
| 2021/0306201 A1* | 9/2021 | Wang | G06N 7/005 |
| 2022/0027257 A1* | 1/2022 | Harutyunyan | G06F 11/0709 |
| 2022/0164246 A1* | 5/2022 | Shen | G06F 11/0793 |
| 2022/0329616 A1* | 10/2022 | O'Hearn | H04L 63/10 |

* cited by examiner

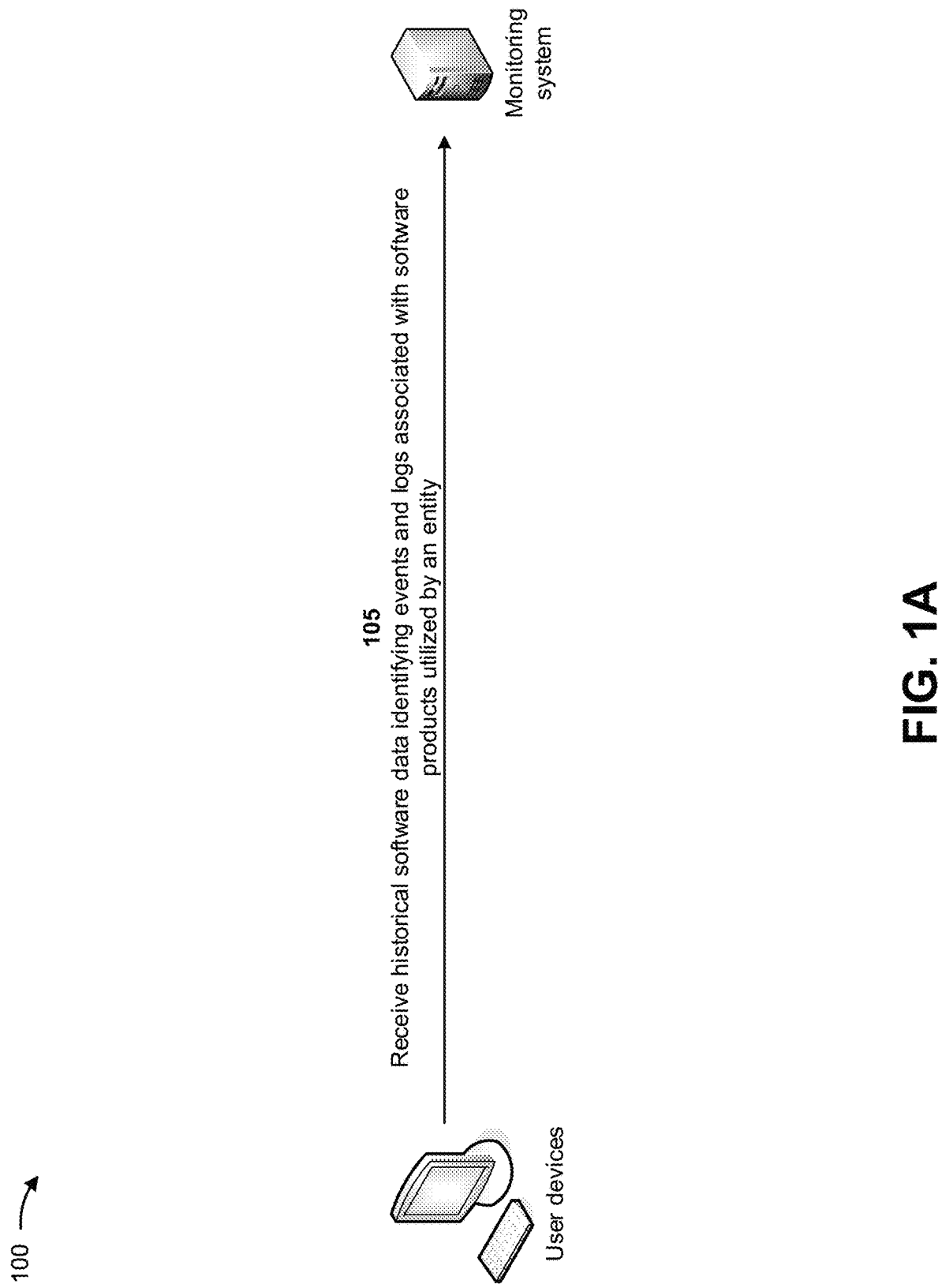

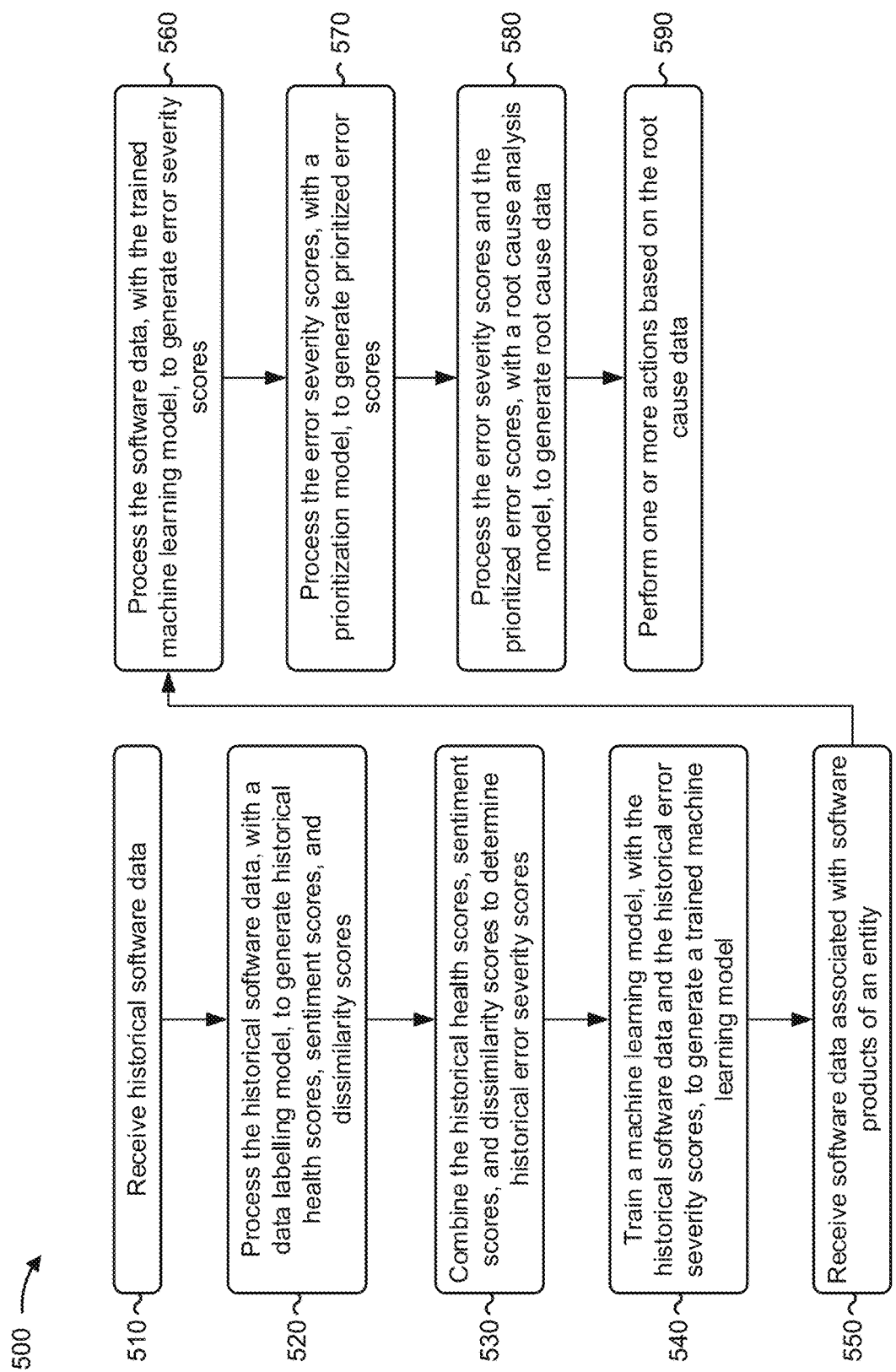

UTILIZING AUTOMATIC LABELLING, PRIORITIZING, AND ROOT CAUSE ANALYSIS MACHINE LEARNING MODELS AND DEPENDENCY GRAPHS TO DETERMINE RECOMMENDATIONS FOR SOFTWARE PRODUCTS

BACKGROUND

Software product development (e.g., DevOps) is a set of practices that combines software development (Dev) and information technology (IT) operations (Ops). DevOps aims to shorten a development life cycle of a software provide and to provide continuous delivery of high-quality software products.

SUMMARY

Some implementations described herein relate to a method. The method may include receiving historical software data identifying events and logs associated with software products utilized by an entity and processing the historical software data, with a data labelling model, to generate historical health scores, historical sentiment scores, and historical dissimilarity scores for the software products. The method may include combining the historical health scores, the historical sentiment scores, and the historical dissimilarity scores to determine historical error severity scores for the software products and training a machine learning model, with the historical software data and the historical error severity scores, to generate a trained machine learning model. The method may include receiving software data identifying current logs and events associated with software products utilized by the entity and processing the software data, with the trained machine learning model, to generate error severity scores for the software products. The method may include processing the error severity scores, with a prioritization model, to generate prioritized error scores and processing the error severity scores and the prioritized error scores, with a root cause analysis model, to generate root cause data identifying root causes associated with the error severity scores. The method may include performing one or more actions based on the root cause data.

Some implementations described herein relate to a device. The device may include one or more memories and one or more processors coupled to the one or more memories. The one or more processors may be configured to receive software data identifying current logs and events associated with software products utilized by an entity and process the software data, with a machine learning model, to generate error severity scores for the software products. The machine learning model may be trained based on historical software data identifying events and logs associated with software products utilized by the entity and based on a combination of historical health scores, historical sentiment scores, and historical dissimilarity scores for the software products. The one or more processors may be configured to process the error severity scores, with a prioritization model, to generate prioritized error scores and process the error severity scores and the prioritized error scores, with a root cause analysis model, to generate root cause data identifying root causes associated with the error severity scores. The one or more processors may be configured to perform one or more actions based on the root cause data.

Some implementations described herein relate to a non-transitory computer-readable medium that stores a set of instructions for a device. The set of instructions, when executed by one or more processors of the device, may cause the device to receive historical software data identifying events and logs associated with software products utilized by an entity and process the historical software data, with a data labelling model, to generate historical health scores, historical sentiment scores, and historical dissimilarity scores for the software products. The set of instructions, when executed by one or more processors of the device, may cause the device to combine the historical health scores, the historical sentiment scores, and the historical dissimilarity scores to determine historical error severity scores for the software products and train a machine learning model, with the historical software data and the historical error severity scores, to generate a trained machine learning model. The set of instructions, when executed by one or more processors of the device, may cause the device to receive software data identifying current logs and events associated with software products utilized by the entity and process the software data, with the trained machine learning model, to generate error severity scores for the software products. The set of instructions, when executed by one or more processors of the device, may cause the device to process the error severity scores, with a prioritization model, to generate prioritized error scores and process the error severity scores and the prioritized error scores, with a root cause analysis model, to generate root cause data identifying root causes associated with the error severity scores. The set of instructions, when executed by one or more processors of the device, may cause the device to generate, based on the root cause data, one or more recommendations associated with one of the software products and provide the one or more recommendations for display.

BRIEF DESCRIPTION OF THE DRAWINGS

FIGS. 1A-1F are diagrams of an example implementation described herein.

FIG. 5 is a flowchart of an example process for utilizing automatic labelling, prioritizing, and root cause analysis machine learning models to determine recommendations for software products.

DETAILED DESCRIPTION

Figure 1B:
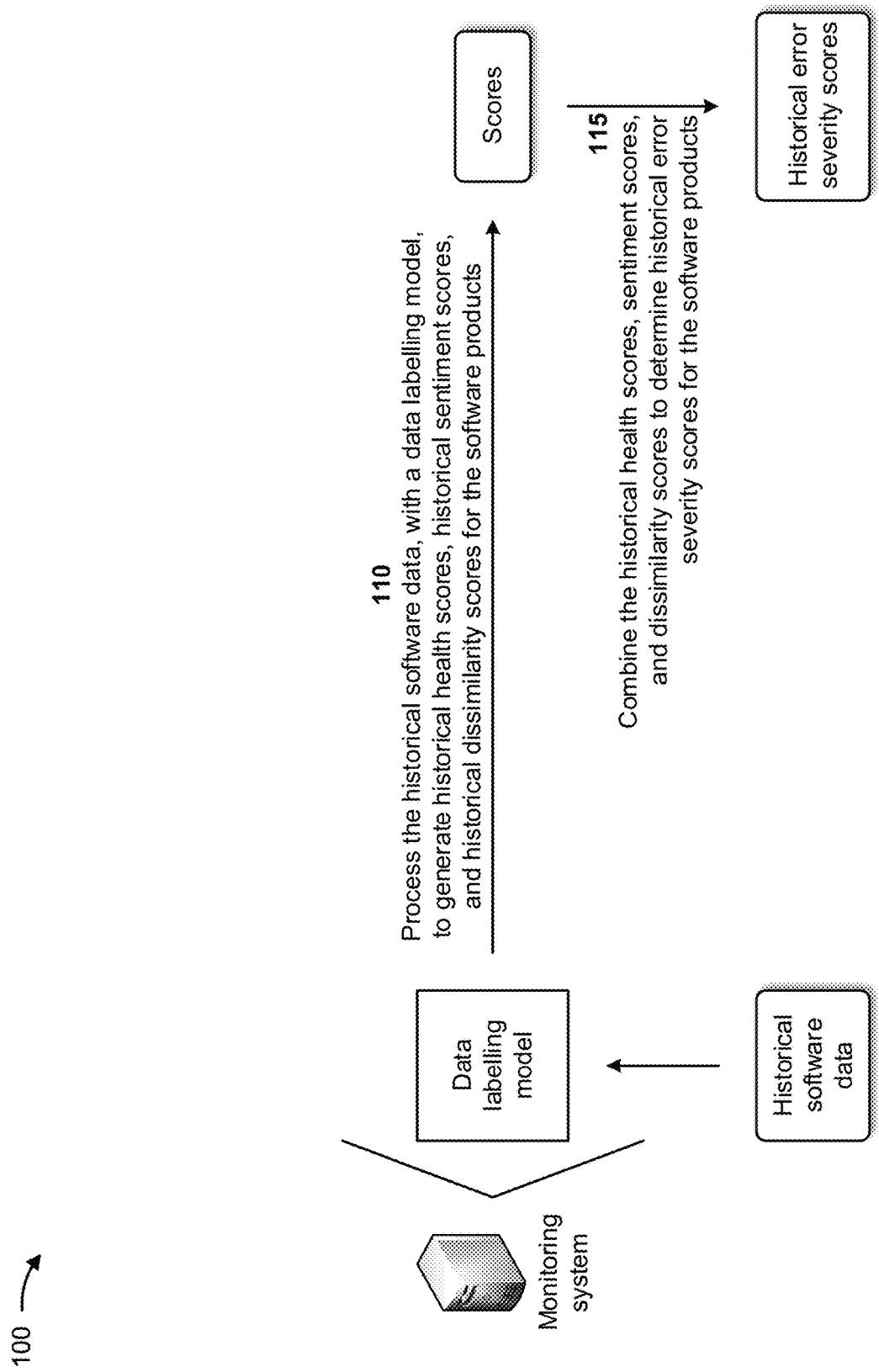

The following detailed description of example implementations refers to the accompanying drawings. The same reference numbers in different drawings may identify the same or similar elements.

Entities (e.g., businesses) are adopting full-spectrum DevOps where software products (e.g., applications, microservices, and/or the like) are provided across different cloud environments to capitalize on benefits of the cloud and build a solution that is highly available. With increasing complexity in creating and deploying software products, providing software products across cloud environments helps entities to be more agile and more productive. Managing the software products for customers is vital to ensure that the software products continuously operate without any interruption or failure. In complex architectures built with numerous software products, intensive monitoring is required to trace communications, correlate events, identify root causes, and ensure that a software product is sustainable across any environment. Manually monitoring error logs for software products is laborious, time consuming, and increases down times for the software products.

Currently there is no automated monitoring and alerting system for software products that provides personalized recommendations specific to entity needs. Existing solutions utilize models that are trained with generic data that is not specific to and/or not relevant for an entity. The generic training data may include error logs of every software product or service that is mandated for a market, whereas an entity may not require the mandated software product or service. The relevance of the trained models to the entity is questionable, and the accuracies of the trained models cannot be determined. Therefore, current techniques for monitoring and managing software products consume computing resources (e.g., processing resources, memory resources, communication resources, and/or the like), networking resources, and/or the like associated with utilizing generic models to generate non-entity specific software product errors that are not prioritized and are sub-optimal, utilizing a software product that is inoperable, providing incorrect recommendations associated with a software product, losing opportunities for the business based on the inoperable software product, correcting the inoperable software product, and/or the like.

Some implementations described herein relate to a monitoring system that utilizes automatic labelling, prioritizing, and root cause analysis machine learning models to determine recommendations for software products. For example, the monitoring system may receive historical software data identifying events and logs associated with software products utilized by an entity and may process the historical software data, with a data labelling model, to generate historical health scores, historical sentiment scores, and historical dissimilarity scores for the software products. The monitoring system may combine the historical health scores, the historical sentiment scores, and the historical dissimilarity scores to determine historical error severity scores for the software products and may train a machine learning model, with the historical software data and the historical error severity scores, to generate a trained machine learning model. The monitoring system may receive software data identifying current logs and events associated with software products utilized by the entity and may process the software data, with the trained machine learning model, to generate error severity scores for the software products. The monitoring system may process the error severity scores, with a prioritization model, to generate prioritized error scores and may process the error severity scores and the prioritized error scores, with a root cause analysis model, to generate root cause data identifying root causes associated with the error severity scores. The monitoring system may perform one or more actions based on the root cause data.

In this way, the monitoring system utilizes automatic labelling, prioritizing, and root cause analysis machine learning models to determine recommendations for software products. The monitoring system may personalize automatic data labelling, error classification, and prioritization of errors for software products of an entity. The monitoring system may analyze interactions between the software products, may intelligently identify a most critical software product for the entity at a particular time, and may utilize this information for prioritization of classified errors. The monitoring system may address important issues first, which may help downstream software products to function correctly. This may enable the monitoring system to correctly prioritize an error based on a severity impact on the entity, identify a root cause for the error, and reduce recovery time for a software product experiencing the error. This, in turn, conserves computing resources, networking resources, and/or the like that would otherwise have been consumed in utilizing generic models to generate non-entity specific software product errors that are not prioritized and are sub-optimal, utilizing a software product that is inoperable, providing incorrect recommendations associated with a software product, losing opportunities for the business based on the inoperable software product, correcting the inoperable software product, and/or the like.

FIGS. 1A-1F are diagrams of an example 100 associated with utilizing automatic labelling, prioritizing, and root cause analysis machine learning models to determine recommendations for software products. As shown in FIGS. 1A-1F, example 100 includes user devices and a monitoring system. Each of the user devices may include a desktop computer, a tablet computer, a laptop computer, and/or the like. The monitoring system may include a system that utilizes automatic labelling, prioritizing, and root cause analysis machine learning models to determine recommendations for software products. Further details of the user devices and the monitoring system are provided elsewhere herein.

As shown in FIG. 1A, and by reference number 105, the monitoring system may receive, from the user devices, historical software data identifying events and logs associated with software products utilized by an entity (e.g., and specific to the entity). The user devices may be associated with developers or programmers of software products. The historical software data may include historical data identifying defects associated with the software products, rework effort to fix defects in the software products, emergency tickets associated with the software products, log failures or errors associated with the software products, performance issues associated with the software products, events (e.g., error messages, errors, and/or the like) associated with the software products, clusters associated with the events and/or the logs, containers associated with the events and/or the logs, cloud environments associated with the events and/or the logs, time periods associated with the events and/or the logs, computing resources associated with the events and/or the logs, operational issues associated with the software products, metrics associated with the software products, and/or the like.

The monitoring system may continuously receive the historical software data, may periodically receive the historical software data, may receive the historical software data upon request by the monitoring system, and/or the like. In some implementations, the historical software data may be provided to the monitoring system via data shippers (e.g., tools that enable the historical software data, such as log files and metrics, easily and reliably transferred to the monitoring system). In some implementations, the monitoring system may store the historical software data in a data structure (e.g., a database, a table, a list, and/or the like) associated with the monitoring system. The data structure may include a defined size limit and may provide high throughput for insert and retrieve operations. The logs of each software product may be stored in individual collections and may be processed based on insertion order. In this way, any quantity of data load may be handled without any need for increased memory size in the data structure.

In some implementations, the monitoring system may check the historical software data for new software products. When a new software product is detected, the monitoring system may cause software data associated with the new software product to be received by the monitoring system along with the historical software data. This may ensure that the software data associated with the new software product is continuously monitored.

In some implementations, the logs of different software products may execute on different nodes in a cluster. A list of unique software products executing in a cluster may be generated by the monitoring system. The monitoring system may monitor the list of software products and may receive logs associated with the list of software products. When a new software product is added to the cluster, the monitoring system may provide details of the new software product to the data structure where a new entry may be inserted in a collection that includes the list of unique software products. In this way, all software products are continuously and parallelly monitored in real-time.

As shown in FIG. 1B, and by reference number 110, the monitoring system may process the historical software data, with a data labelling model, to generate historical health scores, historical sentiment scores, and historical dissimilarity scores for the software products. In some implementations, when processing the historical software data, with the data labelling model, to generate the historical health scores, the monitoring system generates the historical health scores based on whether the software products are operational. In some implementations, when processing the historical software data, with the data labelling model, to generate the historical sentiment scores, the monitoring system preprocesses the historical software data to generate preprocessed historical software data and performs a sentiment analysis on the preprocessed historical software data to generate the historical sentiment scores. In some implementations, when processing the historical software data, with the data labelling model, to generate the historical dissimilarity scores, the monitoring system generates the historical dissimilarity scores based on comparing the logs associated with the software products.

When preprocessing the historical software data to generate the preprocessed historical software data, the monitoring system may perform, on the historical software data, one or more of tokenization, stop word removal, lemmatization, lowercasing, regular expression, and/or the like on the historical software data to generate the preprocessed historical software data. Tokenization may include breaking down logs into simple units. Stop word removal may include removing words from the logs that do not add value for training a machine learning model. For example, for a log error of "from server (Bad Request): container gitlab is not available," the words "from" and "is" do not add value for training a machine learning model and may be removed. Lemmatization may include reducing a given word to a root form of the word. Lemmatization may reduce noise and may increase process execution on the historical software data. For example, words such as "logging" or "logged" may be reduced to "log" which is the root form of the words. Lowercasing may include formatting words of the logs to lowercase. Lowercasing may prevent the machine learning model from differently treating a same word with different cases and may prevent sparsity issues. Regular expression may include defining words, that indicate a potential failure, as important expressions with a weight assigned to each expression based on a sentiment of a word. Regular expression may aid in matching or discovering sets of logs that contain such expressions.

The health of a software product may ensure that the software product is resilient. When processing the historical software data, with the data labelling model, to generate the historical health scores, the monitoring system may determine whether the software products are operational or nonoperational. If a software product is nonoperational, the monitoring system may rate the software product at a value (e.g., one) and may calculate a weight for the software product based on the value (e.g., a weight of 0.5*1=0.5). The weight for the software product may be high since it is important to ensure that the software products are always operational.

When processing the historical software data, with the data labelling model, to generate the historical sentiment scores, the monitoring system may utilize a sentiment analysis to identify sentiments of logs as either positive, negative, or neutral. Prior to identifying the sentiments of the logs, the monitoring system may preprocess the logs to remove noise and transform the logs to avoid inconsistent results, as described above. In some implementations, the monitoring system utilizes natural language processing to determine the sentiments of the logs and weights for the logs. For example, if a log is a highly negative sentiment log, then the monitoring system may assign a larger weight to the log. In some implementations, the monitoring system utilizes subject matter expert inputs to determine weights assigned to the logs.

When processing the historical software data, with the data labelling model, to generate the historical dissimilarity scores, the monitoring system may compare the logs with pure logs (e.g., logs that do not include errors) to determine whether the logs are similar to or dissimilar from the pure logs. Based on a degree of dissimilarity, the monitoring system may assign a weight to each log. For example, the monitoring system may assign a larger weight (e.g., a value close to one) to a log with a large measure of dissimilarity.

In some implementations, the data labelling model may include supervised learning capabilities that can understand and learn from the historical software data. The data labelling model may initiate multiple classifier processes for each software product, and each classifier process may wait for collection of respective logs and may process the respective logs. The data labelling model may determine sentiments of the logs, may determine how similar or dissimilar the logs are from other normal logs and may determine health of the software products. Using this information, the data labelling model may classify the logs as normal or erroneous. For erroneous logs, the data labelling model may determine software product dependency and may prioritize and provide insights about a software product based on the software product dependency. In some implementations, the data labelling model assigns actions to digital assistants to perform quick self-healing measures for the software product.

As further shown in FIG. 1B, and by reference number 115, the monitoring system may combine the historical health scores, the historical sentiment scores, and the historical dissimilarity scores to determine historical error severity scores for the software products. In some implementations, the monitoring system combines the historical health scores, the historical sentiment scores, and the historical dissimilarity scores to determine the historical error severity scores by adding the historical health scores, the historical sentiment scores, and the historical dissimilarity scores to determine the historical error severity scores. In some implementations, the monitoring system combines the historical health scores, the historical sentiment scores, and the historical dissimilarity scores to determine the historical error severity scores by assigning weights to the historical health scores, the historical sentiment scores, and the historical dissimilarity to generate weighted scores, and combining the weighted scores to determine the historical error severity scores.

In some implementations, each of the historical error severity scores is included in one of a first threshold severity range (e.g., a low range of greater than 0.1 and less than or equal to 0.2), a second threshold severity range (e.g., a medium range of greater than 0.2 and less than or equal to 0.5) that is greater than the first threshold severity range, or a third threshold severity range (e.g., a high range of greater than 0.5 and less than or equal to 1.0) that is greater than the second threshold severity range.

Figure 1C:
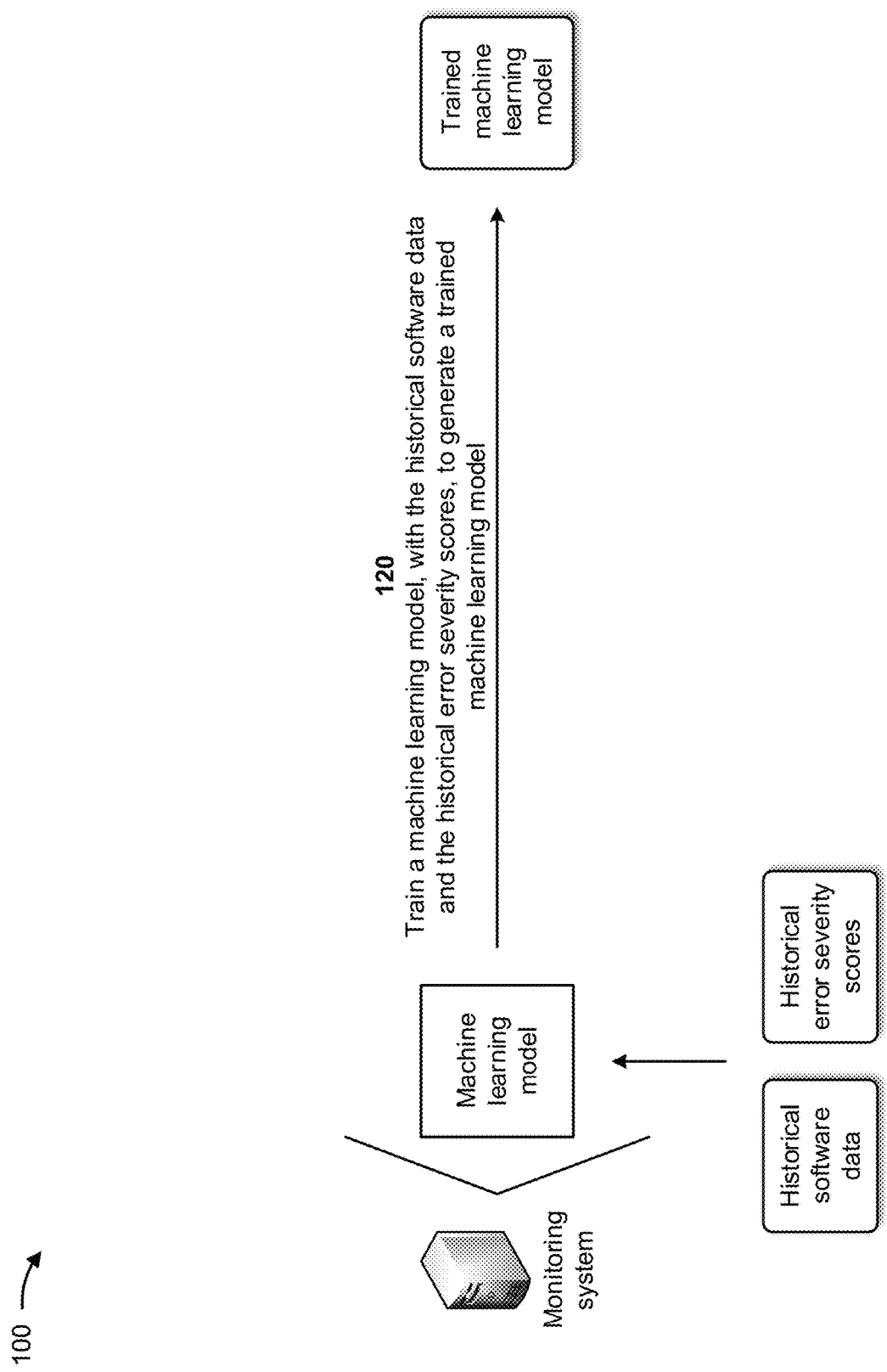

As shown in FIG. 1C, and by reference number 120, the monitoring system may train a machine learning model, with the historical software data and the historical error severity scores, to generate a trained machine learning model. For example, the monitoring system may utilize the historical software data and the historical error severity scores as training data for training the machine learning model. In some implementations, once the historical error severity scores are determined, the historical error severity scores may be provided to a subject matter expert for verification. This may increase the accuracy of the training data utilized to train the machine learning model. Once there is sufficient data, the monitoring system may utilize the actual logs, the preprocessed logs, and the historical error severity scores (e.g., after subject matter expert verification) as the training data for training the machine learning model.

The machine learning model may undergo a supervised learning and may understand patterns of the historical software data and the historical error severity scores through input-output pairs. Based on the supervised learning, the machine learning model may predict an output based on a new input (e.g., a new log). The monitoring system may continuously evaluate the predictions made by the machine learning model and may implement a feedback loop to train the machine learning model until machine learning model makes accurate predictions. Once the predictions made by the machine learning model satisfy a threshold level of accuracy, the monitoring system may not utilize the data labelling model for new software data. Rather, the monitoring system may process the new software data with the machine learning model.

In some implementations, the monitoring system may receive feedback associated with training the machine learning model, with the historical software data and the historical error severity scores, to generate the trained machine learning model and may retrain the trained machine learning model based on the feedback.

Figure 1D:
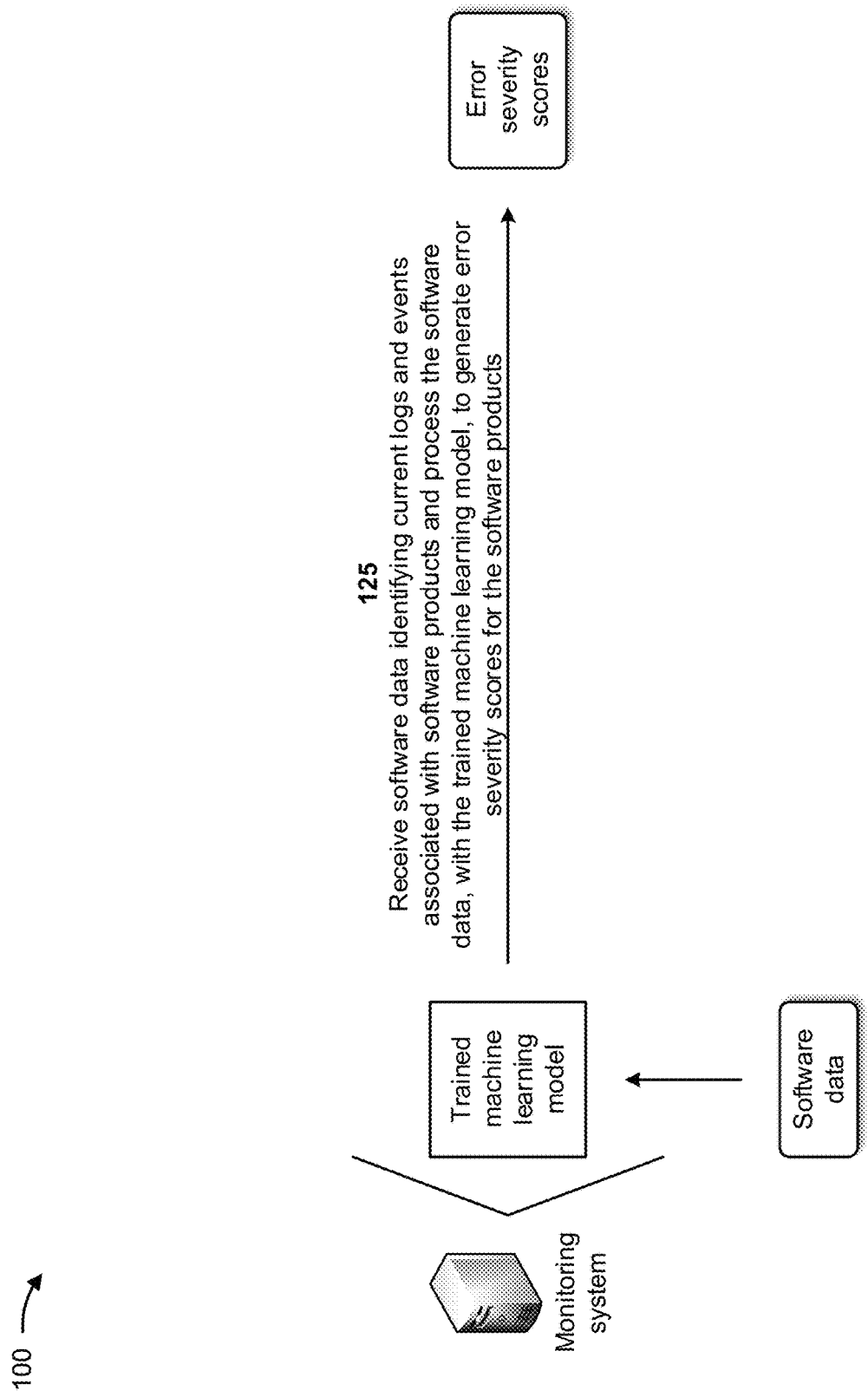

As shown in FIG. 1D, and by reference number 125, the monitoring system may receive software data identifying current logs and events associated with software products and may process the software data, with the trained machine learning model, to generate error severity scores for the software products. For example, the monitoring system may receive the software data from the user devices in a manner similar to the manner the historical software data is received. The software data may include data identifying defects associated with the software products, rework effort to fix defects in the software products, emergency tickets associated with the software products, log failures or errors associated with the software products, performance issues associated with the software products, events (e.g., error messages, errors, and/or the like) associated with the software products, clusters associated with the events and/or the logs, containers associated with the events and/or the logs, cloud environments associated with the events and/or the logs, time periods associated with the events and/or the logs, computing resources associated with the events and/or the logs, operational issues associated with the software products, metrics associated with the software products, and/or the like.

The monitoring system may continuously receive the software data, may periodically receive the software data, may receive the software data upon request by the monitoring system, and/or the like. In some implementations, the software data may be provided to the monitoring system via the data shippers. In some implementations, the monitoring system may store the software data in the data structure associated with the monitoring system.

When processing the software data, with the trained machine learning model, to generate the error severity scores for the software products, the monitoring system may preprocess the software data to generate preprocessed software data, may perform feature extraction on the preprocessed software data to generate values associated with error words in the preprocessed software data, and may process the values associated with the error words, with a decision tree classifier model (e.g., the machine learning model), to generate the error severity scores for the software products. The values associated with the error words may be based on quantities of times the error words occur in the logs. When preprocessing the software data to generate the preprocessed software data, the monitoring system may perform, on the software data, one or more of tokenization, stop word removal, lemmatization, lowercasing, regular expression, and/or the like on the historical software data to generate the preprocessed software data. Tokenization, stop word removal, lemmatization, lowercasing, and regular expression are described above in connection with FIG. 1B.

Figure 1E:
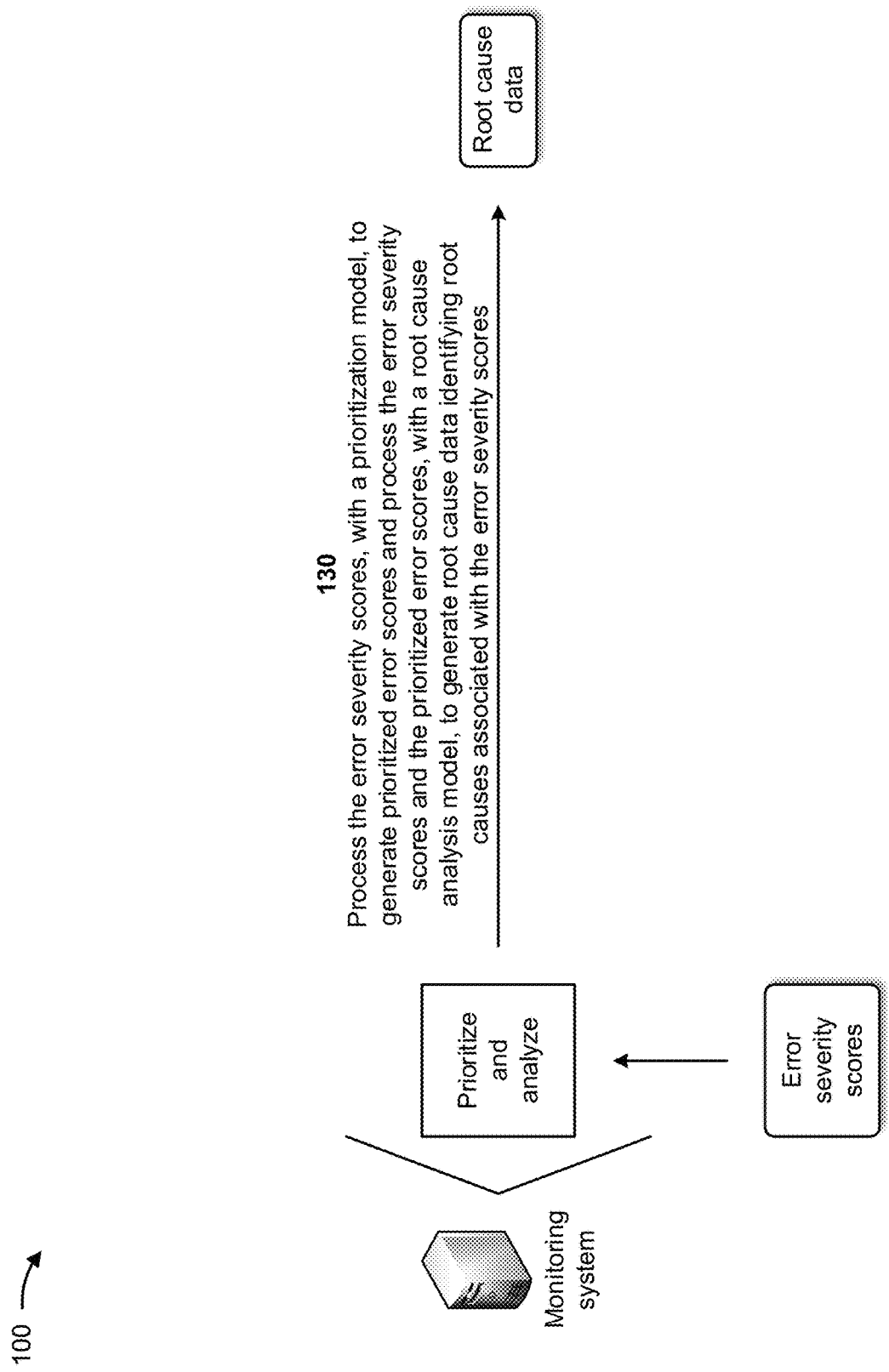

As shown in FIG. 1E, and by reference number 130, the monitoring system may process the error severity scores, with a prioritization model, to generate prioritized error scores and may process the error severity scores and the prioritized error scores, with a root cause analysis model, to generate root cause data identifying root causes associated with the error severity scores. When processing the error severity scores, with the prioritization model, to generate the prioritized error scores, the monitoring system may generate knowledge graphs for the software products and may determine the prioritized error scores based on the knowledge graphs.

Generating the prioritized error scores may enable the monitoring system to identify the most important errors from the logs and the software products associated with the most important errors (e.g., and that need to be serviced). For example, if multiple error severity scores are classified as high, prioritizing such scores among the high class may enable the entity to address the most important errors first. In some implementations, the monitoring system may generate prioritized error scores by identifying the most critical software products using a service dependency graph that displays interactions between different software products through knowledge graphs.

In a knowledge graph, each software product may be depicted as a node and directed edges may depict interactions and interlinks between the different software products. Based on a quantity of dependent software products, the prioritization model may generate a centrality score (e.g., between zero and one). An overall centrality score and a community-wise subgraph may be created to generate a community-based centrality score that will be different from the overall centrality score of a node. If a centrality score of a software product is relatively greater than the other software products in a cluster, then the software product may be considered a more influential and critical software product. The centrality score may be determined after multiple iterations of executing the prioritization model until the prioritization model arrives at an approximate solution that converges. The prioritized error scores may be customized by assigning weights to the software products that are important based on a business requirement.

When processing the error severity scores and the prioritized error scores, with the root cause analysis model, to generate the root cause data, the monitoring system may process training data with the root cause analysis model. The monitoring system may generate the root cause data based on processing the training data, the error severity scores, and the prioritized error scores with the root cause analysis model.

Once the error severity scores prioritized, the monitoring system may identify the root causes for the error severity scores through probabilistic approach. The root cause analysis model may be generated using domain knowledge and training data derived from different metrics in a cluster. In some implementations, the root cause analysis model may be structured with domain knowledge that catalogues root causes of the error severity scores as being one or more of an infrastructure error (e.g., any resource metric related to CPU or memory of any cluster component) associated with one of the software products, a dependency error (e.g., any error arising due to abnormal functioning of other software products) associated with one of the software products, an internal error (e.g., any error caused due to misconfiguration, internal bugs, or exceptions) associated with one of the software products, and/or the like. When an event occurs, the monitoring system may identify a single error or multiple errors that have occurred at a point in time. For example, if there is an error (e.g., an "out of memory error exception"), the monitoring system may check for a bottleneck of system resources.

In some implementations, the monitoring system may utilize community detection models to identify different communities associated with different software products. The monitoring system may utilize network centrality models to identify a most important software product in a particular community. Such models may identify errors occurring within a cluster and may predict errors that might occur in downstream software products that are dependent on a failing software product. In this way, the monitoring system may identify a root cause of an error, as well as predict future errors.

Figure 1F:
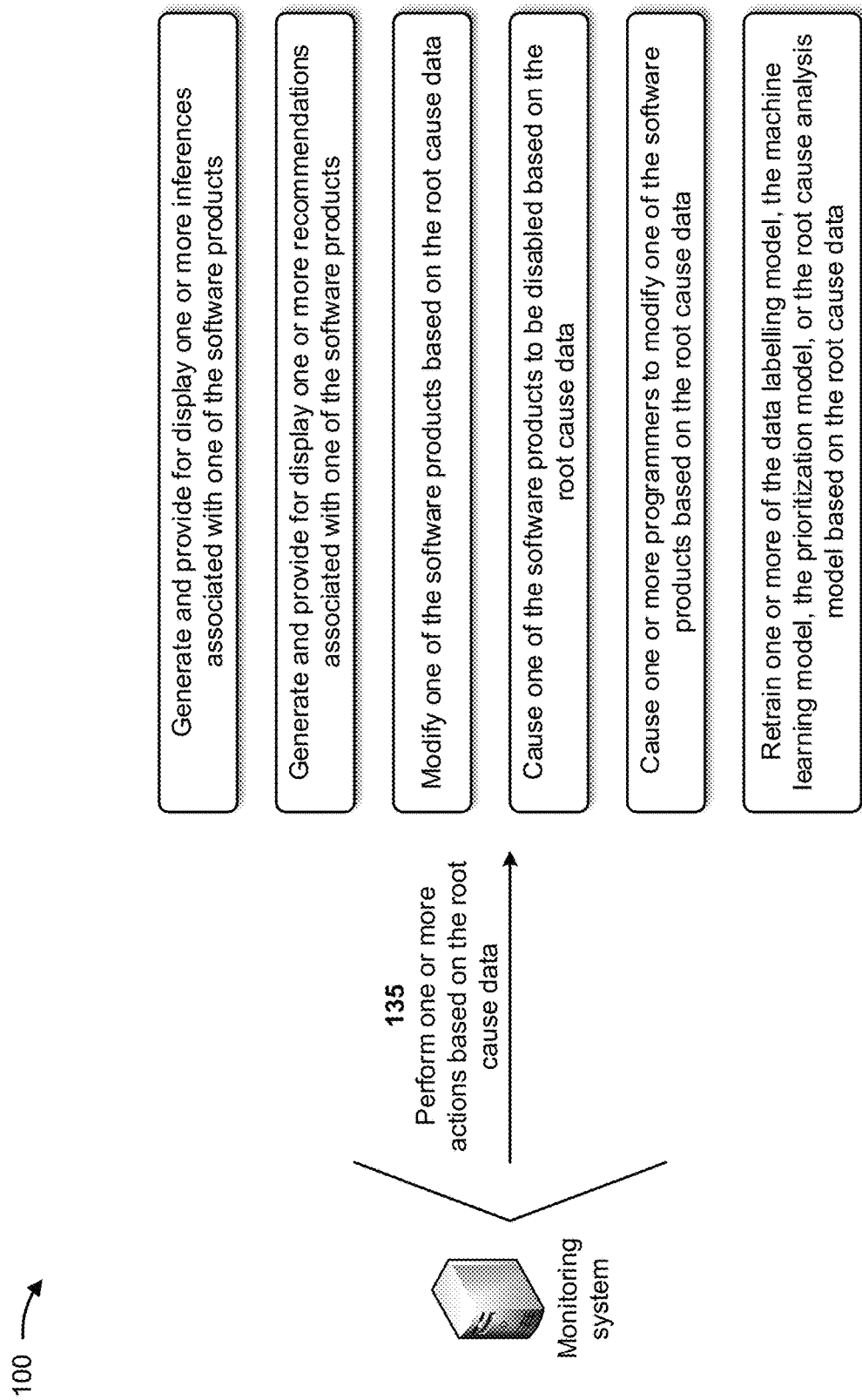

As shown in FIG. 1F, and by reference number 135, the monitoring system may perform one or more actions based on the root cause data. In some implementations, the one or more actions include the monitoring system generating and providing for display one or more inferences associated with one of the software products. For example, the monitoring system may generate the one or more inferences based on the root cause data, such as an inference narrative indicating that a software product will fail based on the root cause data, an inference narrative indicating that the software product will be successful based on the root cause data, and/or the like. The monitoring system may provide the one or more inferences to a user device, and the user device may display the one or more inferences to a user of the user device. In this way, the monitoring system conserves computing resources, networking resources, and/or the like that would otherwise have been consumed in utilizing generic models to generate non-entity specific software product errors that are not prioritized and are sub-optimal, utilizing a software product that is inoperable, providing incorrect recommendations associated with a software product, losing opportunities for the business based on the inoperable software product, correcting the inoperable software product, and/or the like.

In some implementations, the one or more actions include the monitoring system generating and providing for display one or more recommendations associated with one of the software products. For example, the monitoring system may determine one or more recommendations based on the root cause data, such as a recommendation indicating that a software product should be modified, a recommendation indicating that the software product should be disabled, and/or the like. The monitoring system may provide the one or more recommendations to a user device, and the user device may display the one or more recommendations to a user of the user device. In this way, the monitoring system conserves computing resources, networking resources, and/or the like that would otherwise have been consumed in utilizing generic models to generate non-entity specific software product errors that are not prioritized and are sub-optimal, utilizing a software product that is inoperable, and/or the like.

In some implementations, the one or more actions include the monitoring system modifying one of the software products based on the root cause data. For example, the monitoring system may determine one or more modifications to a software product based on the root cause data and may implement the one or more modifications to generate a modified software product. The monitoring system may cause the modified software product to be implemented. In this way, the monitoring system conserves computing resources, networking resources, and/or the like that would otherwise have been consumed in utilizing a software product that is inoperable, losing opportunities for the business based on the inoperable software product, and/or the like.

In some implementations, the one or more actions include the monitoring system causing one of the software products to be disabled based on the root cause data. For example, the monitoring system may determine that the root cause data indicates that a software product is affecting other more important software products and should be disabled. Based on this determination, the monitoring system may cause the software product to be disabled. In this way, the monitoring system conserves computing resources, networking resources, and/or the like that would otherwise have been consumed in affecting the other more important software products, utilizing a software product that is inoperable, losing opportunities for the business based on the inoperable software product, and/or the like.

In some implementations, the one or more actions include the monitoring system causing one or more programmers to modify one of the software products based on the root cause data. For example, the monitoring system may determine one or more modifications to a software product based on the root cause data and may provide the one or more modifications to one or more programmers via user devices. The one or more programmers may utilize the user devices to implement the one or more modifications and to generate a modified software product. The monitoring system may cause the modified software product to be implemented. In this way, the monitoring system conserves computing resources, networking resources, and/or the like that would otherwise have been consumed in utilizing a software product that is inoperable, losing opportunities for the business based on the inoperable software product, and/or the like.

In some implementations, the one or more actions include the monitoring system retraining one or more of the data labelling model, the machine learning model, the prioritization model, or the root cause analysis model based on the root cause data. The monitoring system may utilize the root cause data as additional training data for retraining the one or more of the data labelling model, the machine learning model, the prioritization model, or the root cause analysis model, thereby increasing the quantity of training data available for training the one or more of the data labelling model, the machine learning model, the prioritization model, or the root cause analysis model. Accordingly, the monitoring system may conserve computing resources associated with identifying, obtaining, and/or generating historical data for training the one or more of the data labelling model, the machine learning model, the prioritization model, or the root cause analysis model relative to other systems for identifying, obtaining, and/or generating historical data for training machine learning models.

The monitoring system may be utilized across any cloud provider, on-premise environment, or multi-cloud environments, with zero dependency on any tools and/or services. The monitoring system is a smart and user-friendly system that may provide real-time updates on a centralized dashboard with visual insights to gain comprehensive understanding of software products and an environment of the software products. The monitoring system may personalize automatic data labelling, error classification, and prioritization of errors. Additionally, the monitoring system may analyze interactions of the software products, may intelligently identify a most critical software product for a client at any point in time and accordingly uses this information for prioritization of errors. This may enable an entity to address important issues first, which may enable downstream software products to function correctly and may enable correct prioritization of events based on severity impacts on the entities. This may ease identification of a root cause for an issue and may decrease software product recovery time.

The monitoring system is a cognitive, machine learning-powered system that maintains an integrity of an environment by enhancing software product availability. The monitoring system may efficiently monitor events in a cluster, may correlate behavior of different software products at the time of the event, may train the machine learning model, may provide proactive and reactive insights, may identifies hidden issues, may customize automatic labelling of issues, may provide accurate and precise recommendations to quickly troubleshoot and keep the environment operational, and/or the like. The monitoring system may automatically label data without any manual flagging to identify severities of logs. In this way, the monitoring system optimizes time and effort spent for manual labelling and saves cost by eliminating redundant activities.

The monitoring system may automatically prioritize an error by identifying a most critical software product in an environment using a context built through service discovery. The monitoring system may intuitively make contextually aware dependency identification within a cluster and may automatically detect any new software product in the environment without any manual intervention. The monitoring system may monitor the software products in an environment and may identify patterns or behavior (e.g., how frequently the software product is accessed or an impact the software product has on performance of other software products within a cluster) to identify a critical software product. The monitoring system may analyze logs of any software product operating in any domain that works on container technology in the cloud or on-premise. The monitoring system may be utilized with any project landscape that operates at any scale.

The monitoring system may provide a personalized machine learning model that is trained with high-quality and relevant data according to client business requirements. The monitoring system utilizes logs specific to the software products executing in a cluster and trains the machine learning model that is exclusively used for a specific entity. The monitoring system may proactively and automatically remediate thereby prolonging availability of the software products, reducing inefficiencies in the environment, saving time and effort of support engineers by increasing their productivity, and/or the like.

In this way, the monitoring system utilizes automatic labelling, prioritizing, and root cause analysis machine learning models to determine recommendations for software products. The monitoring system may personalize automatic data labelling, error classification, and prioritization of errors for software products of an entity. The monitoring system may analyze interactions between the software products, may intelligently identify a most critical software product for the entity at a particular time, and may utilize this information for prioritization of classified errors. The monitoring system may address important issues first, which may help downstream software products to function correctly. This may enable the monitoring system to correctly prioritize an error based on a severity impact on the entity, identify a root cause for the error, and reduce recovery time for a software product experiencing the error. This, in turn, conserves computing resources, networking resources, and/or the like that would otherwise have been consumed in utilizing generic models to generate non-entity specific software product errors that are not prioritized and are sub-optimal, utilizing a software product that is inoperable, providing incorrect recommendations associated with a software product, losing opportunities for the business based on the inoperable software product, correcting the inoperable software product, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
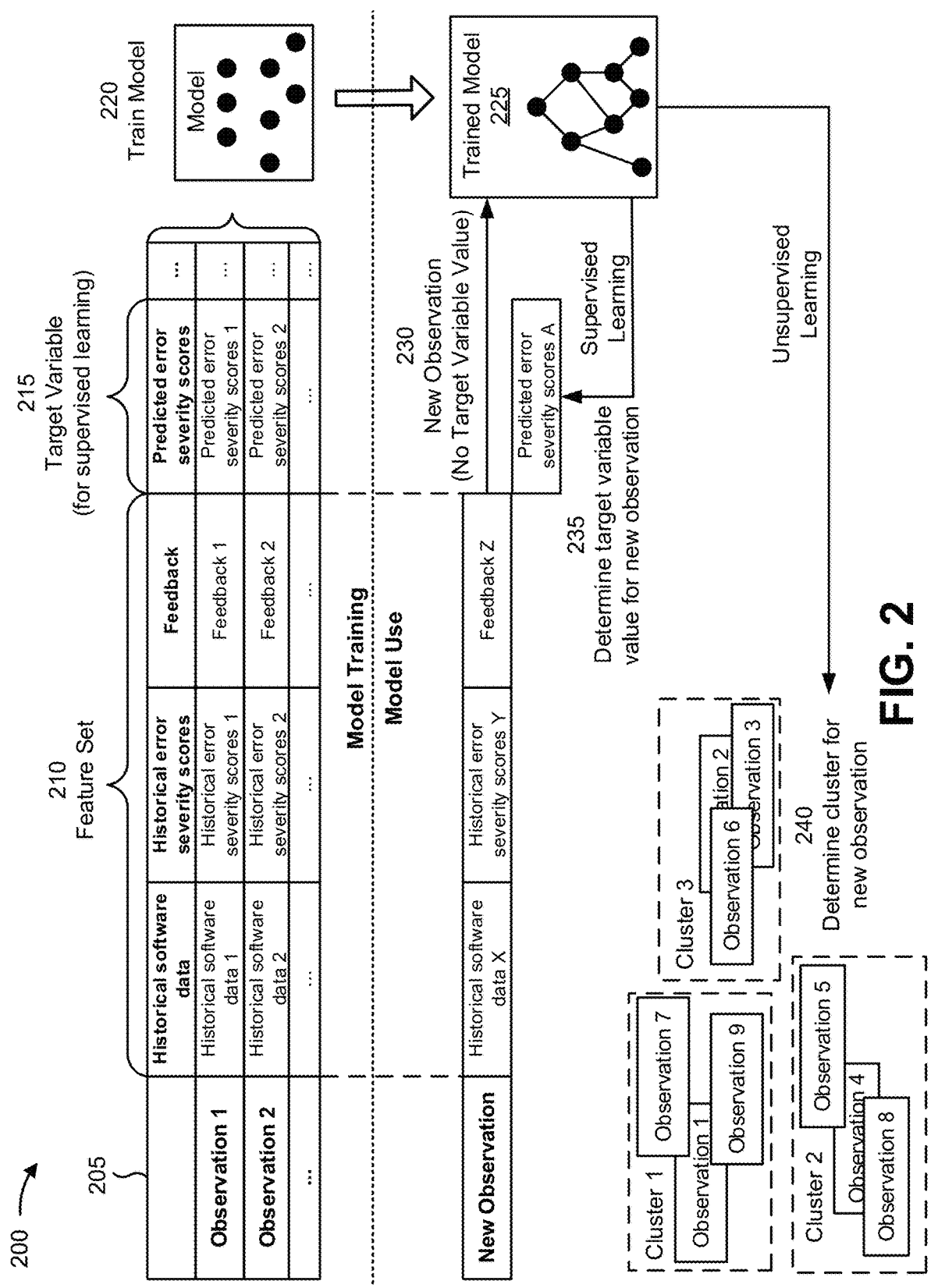
FIG. 2 is a diagram illustrating an example of training and using a machine learning model in connection with determining recommendations for software products.

FIG. 2 is a diagram illustrating an example 200 of training and using a machine learning model in connection with determining recommendations for software products. The machine learning model training and usage described herein may be performed using a machine learning system. The machine learning system may include or may be included in a computing device, a server, a cloud computing environment, and/or the like, such as the monitoring system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the monitoring system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the monitoring system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of historical software data, a second feature of historical error severity scores, a third feature of feedback, and so on. As shown, for a first observation, the first feature may have a value of historical software data 1, the second feature may have a value of historical error severity scores 1, the third feature may have a value of feedback 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is predicted error severity scores, which has a value of predicted error severity scores 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of historical software data X, a second feature of historical error severity scores Y, a third feature of feedback Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of predicted error severity scores A for the target variable of the predicted error severity scores for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a historical software data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a historical error severity scores cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine recommendations for software products. The machine learning system enables recognition and/or identification of tens, hundreds, thousands, or millions of features and/or feature values for tens, hundreds, thousands, or millions of observations, thereby increasing accuracy and consistency and reducing delay associated with determining recommendations for software products relative to requiring computing resources to be allocated for tens, hundreds, or thousands of operators to manually determine recommendations for software products.

As indicated above, FIG. 2 is provided as an example. Other examples may differ from what is described in connection with FIG. 2.

Figure 3:
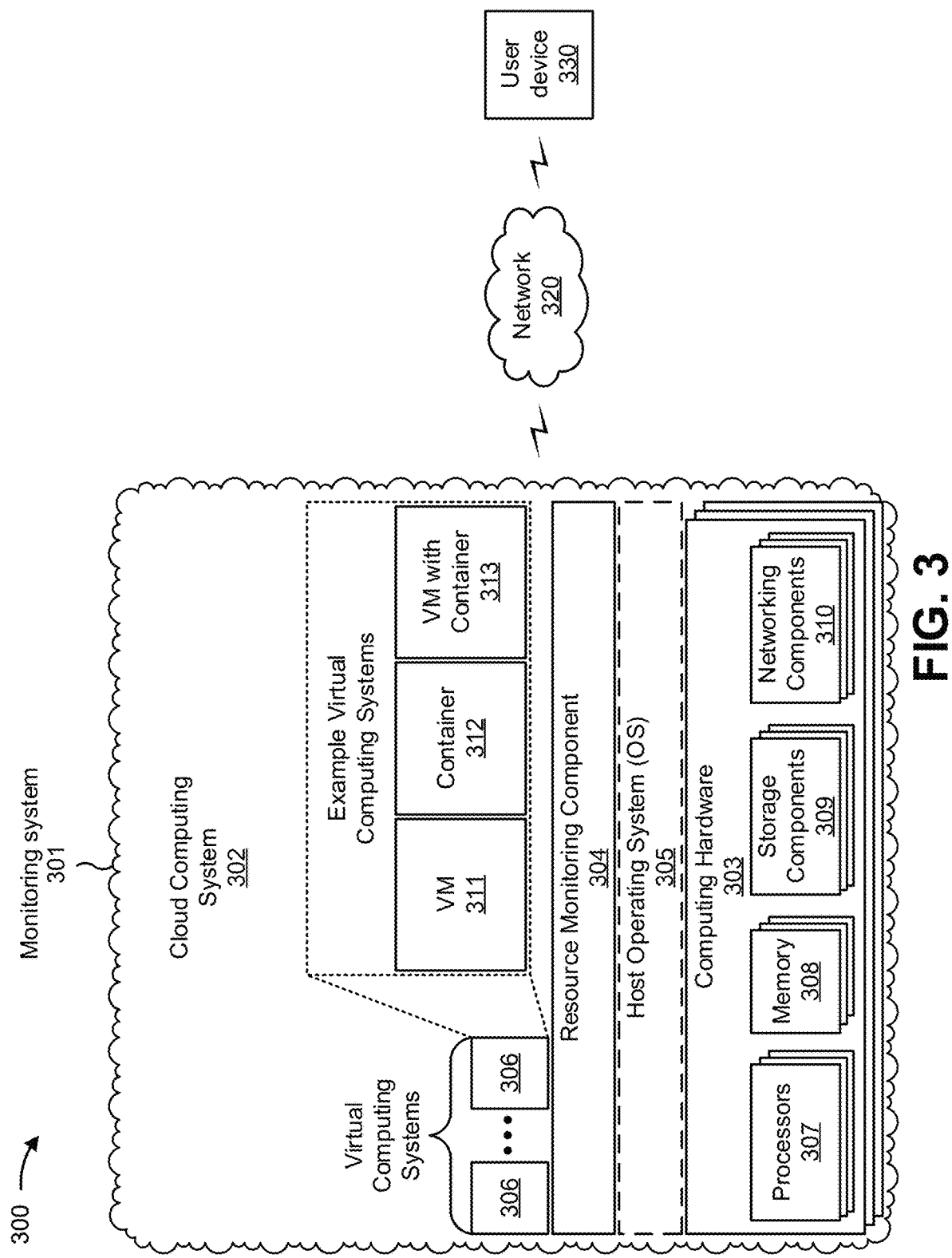
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a monitoring system 301, which may include one or more elements of and/or may execute within a cloud computing system 302. The cloud computing system 302 may include one or more elements 303-313, as described in more detail below. As further shown in FIG. 3, environment 300 may include a network 320 and/or a user device 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the monitoring system 301 may include one or more elements 303-313 of the cloud computing system 302, may execute within the cloud computing system 302, and/or may be hosted within the cloud computing system 302, in some implementations, the monitoring system 301 may not be cloud-based (e.g., may be implemented outside of a cloud computing system) or may be partially cloud-based. For example, the monitoring system 301 may include one or more devices that are not part of the cloud computing system 302, such as device 400 of FIG. 4, which may include a standalone server or another type of computing device. The monitoring system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The user device 330 includes one or more devices capable of receiving, generating, storing, processing, and/or providing information, as described elsewhere herein. The user device 330 may include a communication device and/or a computing device. For example, the user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 330 may communicate with one or more other devices of the environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of environment 300.

Figure 4:
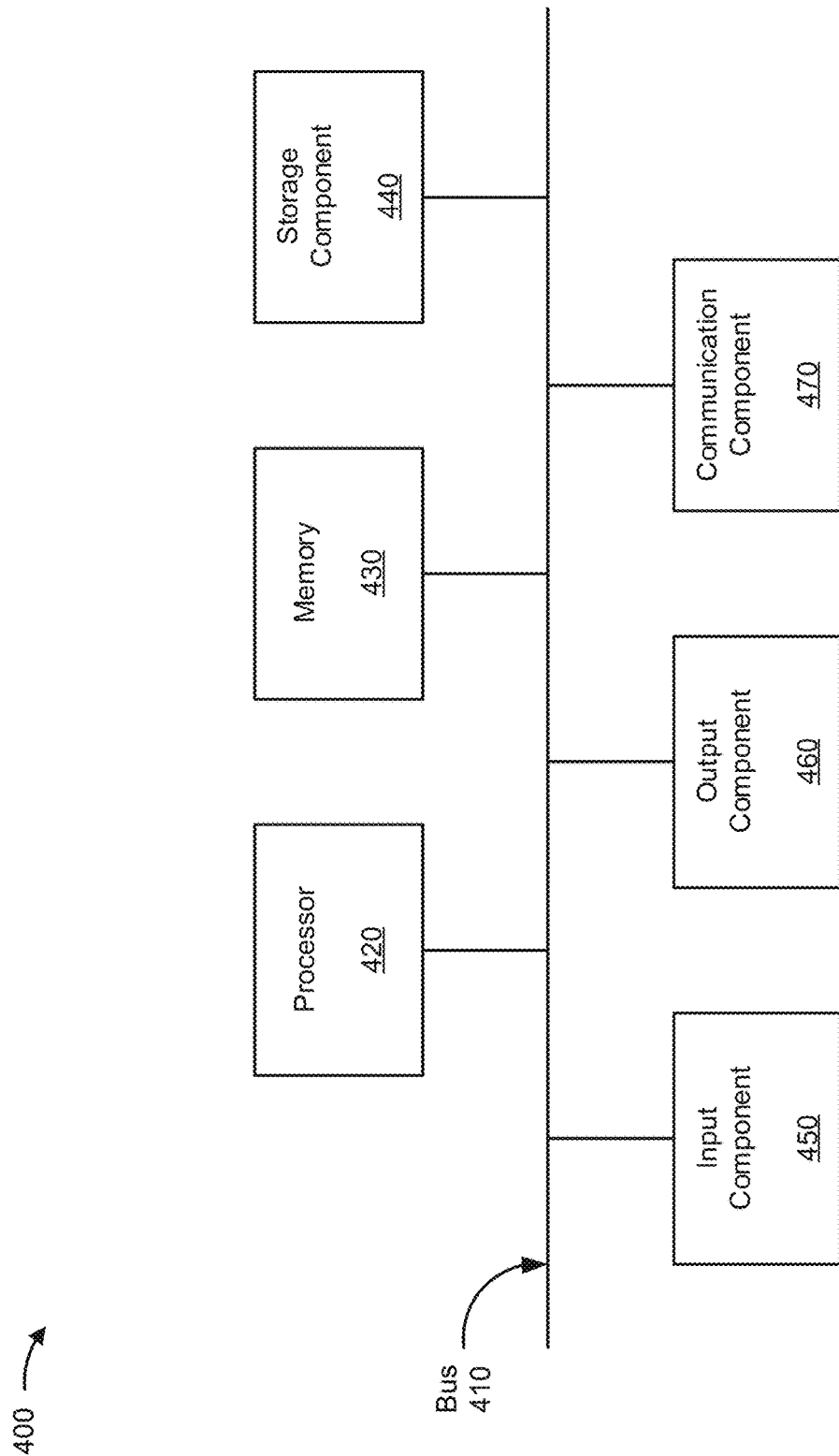
FIG. 4 is a diagram of example components of one or more devices of FIG. 3.

FIG. 4 is a diagram of example components of a device 400, which may correspond to the monitoring system 301 and/or the user device 330. In some implementations, the monitoring system 301 and/or the user device 330 may include one or more devices 400 and/or one or more components of the device 400. As shown in FIG. 4, the device 400 may include a bus 410, a processor 420, a memory 430, a storage component 440, an input component 450, an output component 460, and a communication component 470.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The storage component 440 stores information and/or software related to the operation of the device 400. For example, the storage component 440 may include a hard disk drive, a magnetic disk drive, an optical disk drive, a solid-state disk drive, a compact disc, a digital versatile disc, and/or another type of non-transitory computer-readable medium. The input component 450 enables the device 400 to receive input, such as user input and/or sensed inputs. For example, the input component 450 may include a touch screen, a keyboard, a keypad, a mouse, a button, a microphone, a switch, a sensor, a global positioning system component, an accelerometer, a gyroscope, an actuator, and/or the like. The output component 460 enables the device 400 to provide output, such as via a display, a speaker, and/or one or more light-emitting diodes. The communication component 470 enables the device 400 to communicate with other devices, such as via a wired connection and/or a wireless connection. For example, the communication component 470 may include a receiver, a transmitter, a transceiver, a modem, a network interface card, an antenna, and/or the like.

The device 400 may perform one or more processes described herein. For example, a non-transitory computer-readable medium (e.g., the memory 430 and/or the storage component 440) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for utilizes automatic labelling, prioritizing, and root cause analysis machine learning models to determine recommendations for software products. In some implementations, one or more process blocks of FIG. 5 may be performed by a device (e.g., the monitoring system 301). In some implementations, one or more process blocks of FIG. 5 may be performed by another device or a group of devices separate from or including the device, such as a user device (e.g., the user device 330). Additionally, or alternatively, one or more process blocks of FIG. 5 may be performed by one or more components of the device 400, such as the processor 420, the memory 430, the storage component 440, the input component 450, the output component 460, and/or the communication component 470.

As shown in FIG. 5, process 500 may include receiving historical software data identifying events and logs associated with software products utilized by an entity (block 510). For example, the device may receive historical software data identifying events and logs associated with software products utilized by an entity, as described above.

As further shown in FIG. 5, process 500 may include processing the historical software data, with a data labelling model, to generate historical health scores, historical sentiment scores, and historical dissimilarity scores for the software products (block 520). For example, the device may process the historical software data, with a data labelling model, to generate historical health scores, historical sentiment scores, and historical dissimilarity scores for the software products, as described above. In some implementations, processing the historical software data, with the data labelling model, to generate the historical health scores, the historical sentiment scores, and the historical dissimilarity scores includes generating the historical health scores based on whether the software products are operational, preprocessing the historical software data to generate preprocessed historical software data, performing a sentiment analysis on the preprocessed historical software data to generate the historical sentiment scores, and generating the historical dissimilarity scores based on comparing the logs associated with the software products.

In some implementations, preprocessing the historical software data to generate the preprocessed historical software data includes one or more of performing tokenization on the historical software data to generate the preprocessed historical software data, performing stop word removal on the historical software data to generate the preprocessed historical software data, performing lemmatization on the historical software data to generate the preprocessed historical software data, performing lowercasing on the historical software data to generate the preprocessed historical software data, or performing regular expression on the historical software data to generate the preprocessed historical software data.

As further shown in FIG. 5, process 500 may include combining the historical health scores, the historical sentiment scores, and the historical dissimilarity scores to determine historical error severity scores for the software products (block 530). For example, the device may combine the historical health scores, the historical sentiment scores, and the historical dissimilarity scores to determine historical error severity scores for the software products, as described above. In some implementations, combining the historical health scores, the historical sentiment scores, and the historical dissimilarity scores to determine the historical error severity scores includes adding the historical health scores, the historical sentiment scores, and the historical dissimilarity scores to determine the historical error severity scores. In some implementations, combining the historical health scores, the historical sentiment scores, and the historical dissimilarity scores to determine the historical error severity scores includes assigning weights to the historical health scores, the historical sentiment scores, and the historical dissimilarity to generate weighted scores, and combining the weighted scores to determine the historical error severity scores.

In some implementations, each of the historical error severity scores is included in one of a first threshold severity range, a second threshold severity range that is greater than the first threshold severity range, or a third threshold severity range that is greater than the second threshold severity range.

As further shown in FIG. 5, process 500 may include training a machine learning model, with the historical software data and the historical error severity scores, to generate a trained machine learning model (block 540). For example, the device may train a machine learning model, with the historical software data and the historical error severity scores, to generate a trained machine learning model, as described above.

As further shown in FIG. 5, process 500 may include receiving software data identifying current logs and events associated with software products utilized by the entity (block 550). For example, the device may receive software data identifying current logs and events associated with software products utilized by the entity, as described above.

As further shown in FIG. 5, process 500 may include processing the software data, with the trained machine learning model, to generate error severity scores for the software products (block 560). For example, the device may process the software data, with the trained machine learning model, to generate error severity scores for the software products, as described above. In some implementations, processing the software data, with the trained machine learning model, to generate the error severity scores for the software products includes preprocessing the software data to generate preprocessed software data, performing feature extraction on the preprocessed software data to generate values associated with error words in the preprocessed software data, and processing the values associated with the error words, with a decision tree classifier model, to generate the error severity scores for the software products.

In some implementations, preprocessing the software data to generate the preprocessed software data includes one or more of performing tokenization on the software data to generate the preprocessed software data, performing stop word removal on the software data to generate the preprocessed software data, performing lemmatization on the software data to generate the preprocessed software data, performing lowercasing on the software data to generate the preprocessed software data, or performing regular expression on the software data to generate the preprocessed software data.

As further shown in FIG. 5, process 500 may include processing the error severity scores, with a prioritization model, to generate prioritized error scores (block 570). For example, the device may process the error severity scores, with a prioritization model, to generate prioritized error scores, as described above. In some implementations, processing the error severity scores, with the prioritization model, to generate the prioritized error scores includes generating knowledge graphs for the software products, and determining the prioritized error scores based on the knowledge graphs.

As further shown in FIG. 5, process 500 may include processing the error severity scores and the prioritized error scores, with a root cause analysis model, to generate root cause data identifying root causes associated with the error severity scores (block 580). For example, the device may process the error severity scores and the prioritized error scores, with a root cause analysis model, to generate root cause data identifying root causes associated with the error severity scores, as described above. In some implementations, processing the error severity scores and the prioritized error scores, with the root cause analysis model, to generate root cause data includes processing training data with the root cause analysis model, wherein the training data includes a knowledge graph and metrics associated with a root cause cluster, and generating the root cause data based on processing the training data, the error severity scores, and the prioritized error scores with the root cause analysis model. In some implementations, each of the root causes includes one or more of an infrastructure error associated with one of the software products, a dependency error associated with one of the software products, or an internal error associated with one of the software products.

As further shown in FIG. 5, process 500 may include performing one or more actions based on the root cause data (block 590). For example, the device may perform one or more actions based on the root cause data, as described above. In some implementations, performing the one or more actions based on the root cause data includes one or more of generating and providing for display one or more inferences associated with one of the software products, generating and providing for display one or more recommendations associated with one of the software products, modifying one of the software products based on the root cause data, causing one of the software products to be disabled based on the root cause data, causing one or more programmers to modify one of the software products based on the root cause data, or retraining one or more of the machine learning model, the prioritization model, or the root cause analysis model based on the root cause data.

Process 500 may include additional implementations, such as any single implementation or any combination of implementations described below and/or in connection with one or more other processes described elsewhere herein.

In some implementations, process 500 includes receiving feedback associated with training the machine learning model, with the historical software data and the historical error severity scores, to generate the trained machine learning model, and retraining the trained machine learning model based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising: receiving, by a device, historical software data identifying events and logs associated with software products utilized by an entity; processing, by the device, the historical software data, with a data labelling model, to generate historical health scores, historical sentiment scores, and historical dissimilarity scores for the software products; combining, by the device, the historical health scores, the historical sentiment scores, and the historical dissimilarity scores to determine historical error severity scores for the software products; automatically training, by the device, a machine learning model, with the historical software data and the historical error severity scores, to generate a trained machine learning model, wherein the training comprises: determining, based on supervised learning of the machine learning model and based on new input, a prediction; implementing a feedback loop to train the machine learning model; and determining whether the prediction satisfies a threshold level of accuracy, and wherein new historical software data is processed with the trained machine learning model instead of the data labeling model when the prediction satisfies the threshold level of accuracy; receiving, by the device, software data identifying current logs and events associated with software products utilized by the entity; processing, by the device, the software data, with the trained machine learning model, to generate error severity scores for the software products; processing, by the device, the error severity scores, with a prioritization model, to generate prioritized error scores; processing, by the device, the error severity scores and the prioritized error scores, with a root cause analysis model, to generate root cause data identifying root causes associated with the error severity scores; performing, by the device, one or more actions based on the root cause data; receiving, by the device, feedback via the feedback loop; and retraining, by the device and based on the feedback, the trained machine learning model.

2. The method of claim 1, wherein processing the historical software data, with the data labelling model, to generate the historical health scores, the historical sentiment scores, and the historical dissimilarity scores comprises:
    generating the historical health scores based on whether the software products are operational;
    preprocessing the historical software data to generate preprocessed historical software data;
    performing a sentiment analysis on the preprocessed historical software data to generate the historical sentiment scores; and
    generating the historical dissimilarity scores based on comparing the logs associated with the software products.

3. The method of claim 2, wherein preprocessing the historical software data to generate the preprocessed historical software data comprises one or more of:
    performing tokenization on the historical software data to generate the preprocessed historical software data;
    performing stop word removal on the historical software data to generate the preprocessed historical software data;
    performing lemmatization on the historical software data to generate the preprocessed historical software data;
    performing lowercasing on the historical software data to generate the preprocessed historical software data; or
    performing regular expression on the historical software data to generate the preprocessed historical software data.

4. The method of claim 1, wherein combining the historical health scores, the historical sentiment scores, and the historical dissimilarity scores to determine the historical error severity scores comprises:
    adding the historical health scores, the historical sentiment scores, and the historical dissimilarity scores to determine the historical error severity scores.

5. The method of claim 1, wherein combining the historical health scores, the historical sentiment scores, and the historical dissimilarity scores to determine the historical error severity scores comprises:
    assigning weights to the historical health scores, the historical sentiment scores, and the historical dissimilarity to generate weighted scores; and
    combining the weighted scores to determine the historical error severity scores.

6. The method of claim 1, wherein each of the historical error severity scores is included in one of:
    a first threshold severity range;

a second threshold severity range that is greater than the first threshold severity range; or a third threshold severity range that is greater than the second threshold severity range.

7. The method of claim 1, wherein the feedback is associated with training with the historical software data and the historical error severity scores.

8. A device, comprising: one or more memories; and one or more processors, coupled to the one or more memories, configured to: receive historical software data identifying logs and events associated with software products utilized by an entity; process the historical software data with a data labelling model to generate historical health scores, historical sentiment scores, and historical dissimilarity scores for the software products; train a machine learning model based on the historical software data and based on a combination of the historical health scores, the historical sentiment scores, and the historical dissimilarity scores, wherein the training comprises: determining, based on supervised learning of the machine learning model and based on new input, a prediction; implementing a feedback loop to train the machine learning model; and determining whether the prediction satisfies a threshold level of accuracy, and wherein new historical software data is processed with the trained machine learning model instead of the data labeling model when the prediction satisfies the threshold level of accuracy; receive software data identifying current logs and events associated with software products utilized by the entity; process the software data with the trained machine learning model to generate error severity scores associated with the software products; process the error severity scores, with a prioritization model, to generate prioritized error scores; process the error severity scores and the prioritized error scores, with a root cause analysis model, to generate root cause data identifying root causes associated with the error severity scores; perform one or more actions based on the root cause data; receive feedback via the feedback loop; and retrain, based on the feedback, the trained machine learning model.

9. The device of claim 8, wherein the one or more processors, to process the software data, with the machine learning model, to generate the error severity scores for the software products, are configured to:
preprocess the software data to generate preprocessed software data;
perform feature extraction on the preprocessed software data to generate values associated with error words in the preprocessed software data; and
process the values associated with the error words, with a decision tree classifier model, to generate the error severity scores for the software products.

10. The device of claim 9, wherein the one or more processors, to preprocess the software data to generate the preprocessed software data, are configured to one or more of:
perform tokenization on the software data to generate the preprocessed software data;
perform stop word removal on the software data to generate the preprocessed software data;
perform lemmatization on the software data to generate the preprocessed software data;
perform lowercasing on the software data to generate the preprocessed software data; or
perform regular expression on the software data to generate the preprocessed software data.

11. The device of claim 8, wherein the one or more processors, to process the error severity scores, with the prioritization model, to generate the prioritized error scores, are configured to:
generate knowledge graphs for the software products; and
determine the prioritized error scores based on the knowledge graphs.

12. The device of claim 8, wherein the one or more processors, to process the error severity scores and the prioritized error scores, with the root cause analysis model, to generate the root cause data identifying the root causes associated with the error severity scores, are configured to:
process training data with the root cause analysis model, wherein the training data includes a knowledge graph and metrics associated with a root cause cluster; and
generate the root cause data based on processing the training data, the error severity scores, and the prioritized error scores with the root cause analysis model.

13. The device of claim 8, wherein each of the root causes includes one or more of:
an infrastructure error associated with one of the software products,
a dependency error associated with one of the software products, or
an internal error associated with one of the software products.

14. The device of claim 8, wherein the one or more processors, to perform the one or more actions based on the root cause data, are configured to one or more of:
generate and provide for display one or more inferences associated with one of the software products;
generate and provide for display one or more recommendations associated with one of the software products;
modify one of the software products based on the root cause data;
cause one of the software products to be disabled based on the root cause data;
cause one or more programmers to modify one of the software products based on the root cause data; or
retrain one or more of the machine learning model, the prioritization model, or the root cause analysis model based on the root cause data.

15. The device of claim 8, wherein the feedback is associated with training with the historical software data.

16. A non-transitory computer-readable medium storing a set of instructions, the set of instructions comprising: one or more instructions that, when executed by one or more processors of a device, cause the device to: receive historical software data identifying events and logs associated with software products utilized by an entity; process the historical software data, with a data labelling model, to generate historical health scores, historical sentiment scores, and historical dissimilarity scores for the software products; combine the historical health scores, the historical sentiment scores, and the historical dissimilarity scores to determine historical error severity scores for the software products; automatically train a machine learning model, with the historical software data and the historical error severity scores, to generate a trained machine learning model, wherein the training comprises: determining, based on supervised learning of the machine learning model and based on new input, a prediction; implementing a feedback loop to train the machine learning model; and determining whether the prediction satisfies a threshold level of accuracy, and wherein new historical software data is processed with the trained machine learning model instead of the data labeling model when the prediction satisfies the threshold level of accuracy; receive software data identifying current logs and events associated with software products utilized by the entity; process the software data, with the trained machine learning model, to generate error severity scores for the software products; process the error severity scores, with a prioritization model, to generate prioritized error scores; process the error severity scores and the prioritized error scores, with a root cause analysis model, to generate root cause data identifying root causes associated with the error severity scores; generate, based on the root cause data, one or more recommendations associated with one of the software products; and provide the one or more recommendations for display; receive feedback via the feedback loop; and retrain, based on the feedback, the trained machine learning model.

17. The non-transitory computer-readable medium of claim 16, wherein the one or more instructions, that cause the device to process the historical software data, with the data labelling model, to generate the historical health scores, the historical sentiment scores, and the historical dissimilarity scores, cause the device to:
   generate the historical health scores based on whether the software products are operational;
   preprocess the historical software data to generate preprocessed historical software data;
   perform a sentiment analysis on the preprocessed historical software data to generate the historical sentiment scores; and
   generate the historical dissimilarity scores based on comparing the logs associated with the software products.

18. The non-transitory computer-readable medium of claim 17, wherein the one or more instructions, that cause the device to preprocess the historical software data to generate the preprocessed historical software data, cause the device to one or more of:
   perform tokenization on the historical software data to generate the preprocessed historical software data;
   perform stop word removal on the historical software data to generate the preprocessed historical software data;
   perform lemmatization on the historical software data to generate the preprocessed historical software data;
   perform lowercasing on the historical software data to generate the preprocessed historical software data; or
   perform regular expression on the historical software data to generate the preprocessed historical software data.

19. The non-transitory computer-readable medium of claim 16, wherein the one or more instructions, that cause the device to process the software data, with the trained machine learning model, to generate the error severity scores for the software products, cause the device to:
   preprocess the software data to generate preprocessed software data;
   perform feature extraction on the preprocessed software data to generate values associated with error words in the preprocessed software data; and
   process the values associated with the error words, with a decision tree classifier model, to generate the error severity scores for the software products.

20. The non-transitory computer-readable medium of claim 16, wherein the one or more instructions, that cause the device to process the error severity scores, with the prioritization model, to generate the prioritized error scores, cause the device to:
   generate knowledge graphs for the software products; and
   determine the prioritized error scores based on the knowledge graphs.

* * * * *